United States Patent
Atlas

[15] 3,646,555
[45] Feb. 29, 1972

[54] METHOD AND APPARATUS FOR RADAR TURBULENCE DETECTION

[72] Inventor: David Atlas, 5522 South Harper, Chicago, Ill. 60637

[22] Filed: May 2, 1969

[21] Appl. No.: 821,389

[52] U.S. Cl. ........................................343/5 W, 343/17.1 R
[51] Int. Cl. ........................................G01s 9/02, G01w 1/00
[58] Field of Search ........................................343/5 W, 17.1

[56] References Cited

UNITED STATES PATENTS

| | | | |
|---|---|---|---|
| 3,341,844 | 9/1967 | Sweeney | 343/5 W |
| 3,359,557 | 12/1967 | Fow et al. | 343/5 W UX |

*Primary Examiner*—T. H. Tubbesing
*Attorney*—Dressler, Goldsmith, Clement & Gordon

[57] ABSTRACT

Method and apparatus for detecting atmospheric turbulence with a conventional, non-Doppler radar by detecting echo signals from two pulse volumes radially spaced apart along the radar beam. The measurement of the atmospheric turbulence is effected by measuring the average power of the echo signal from each of the two pulse volumes, by measuring the variance in the fluctuation spectra of these signals, and by measuring the variance of the signals representative of the predetection sum of the echo signals from both pulse volumes. The difference in the mean velocities of the scatterers in the pulse volumes, a measurement of the atmospheric turbulence, can be calculated since it is a function of the difference between the power-weighted variance of the fluctuation spectrum of the predetection sum of the echo signals from both pulse volumes and the sum of the power-weighted variances of the fluctuation spectra of the echo signals from each of the pulse volumes.

25 Claims, 8 Drawing Figures

PATENTED FEB 29 1972  3,646,555
SHEET 1 OF 3
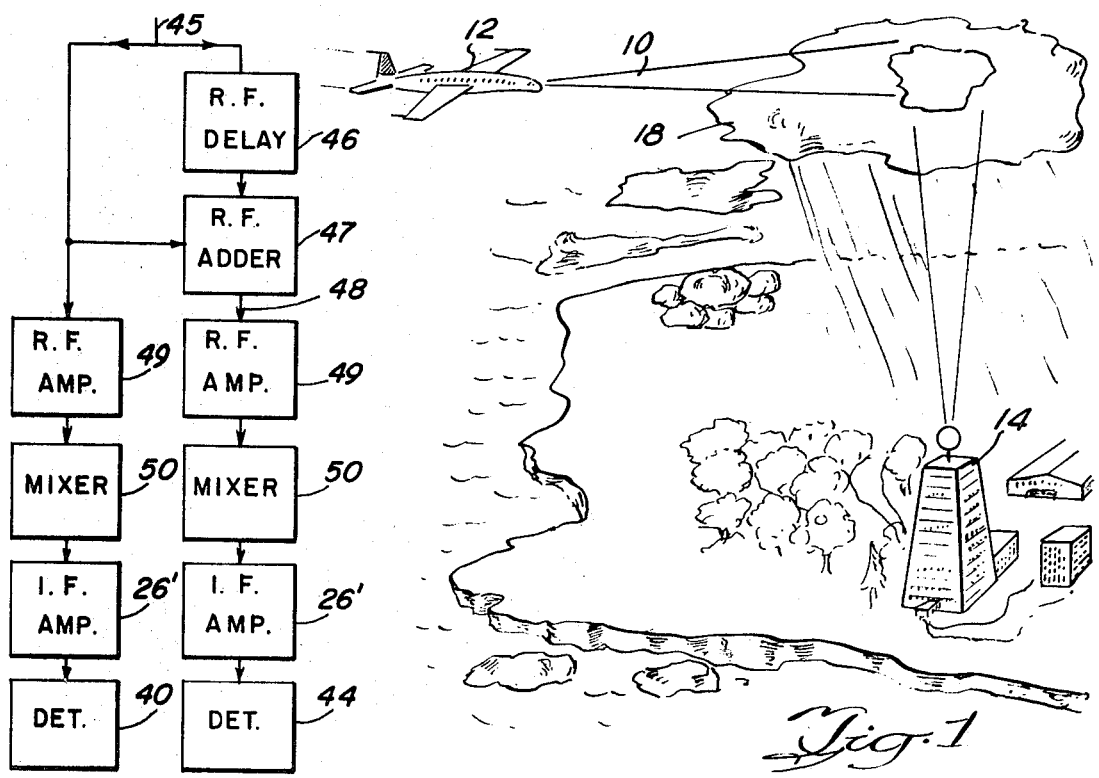
Fig. 1
Fig. II
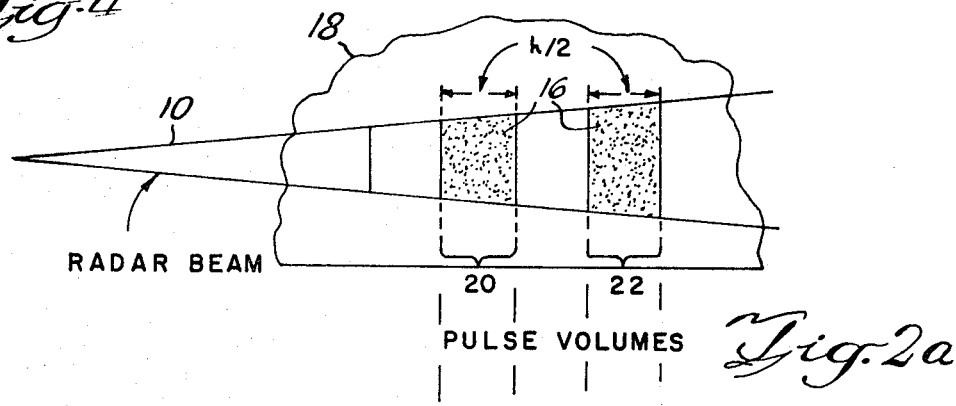
Fig. 2a
Fig. 2b
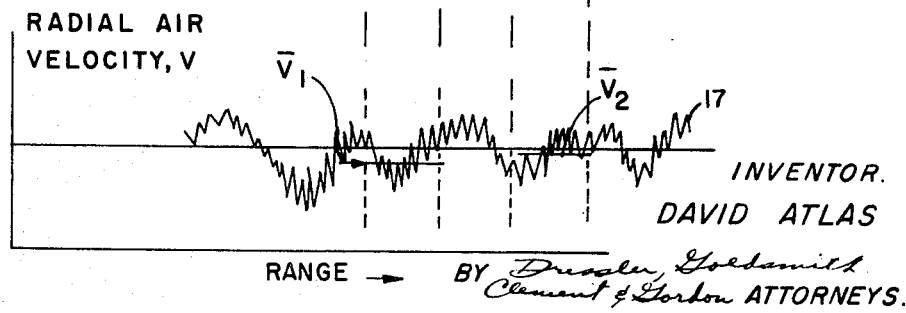
INVENTOR.
DAVID ATLAS
BY Dressler, Goldsmith, Clement & Gordon ATTORNEYS.

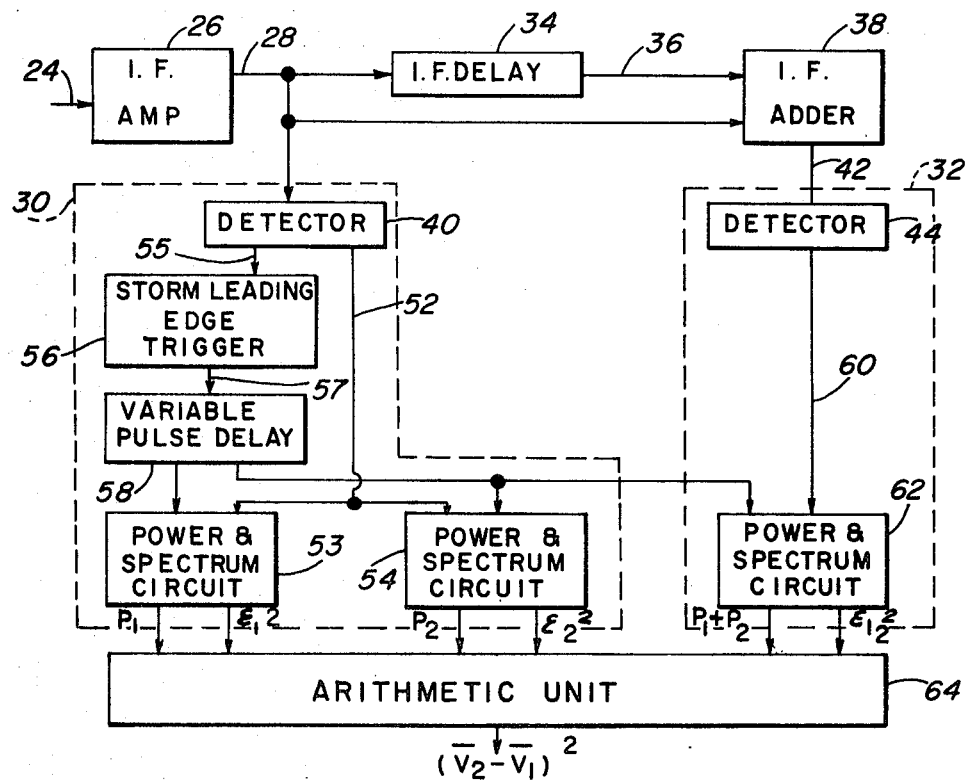
Fig. 3
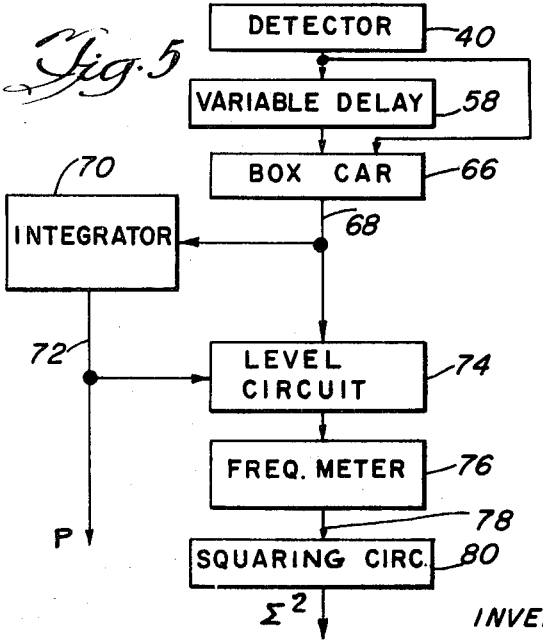
Fig. 4a
Fig. 5
INVENTOR.
DAVID ATLAS

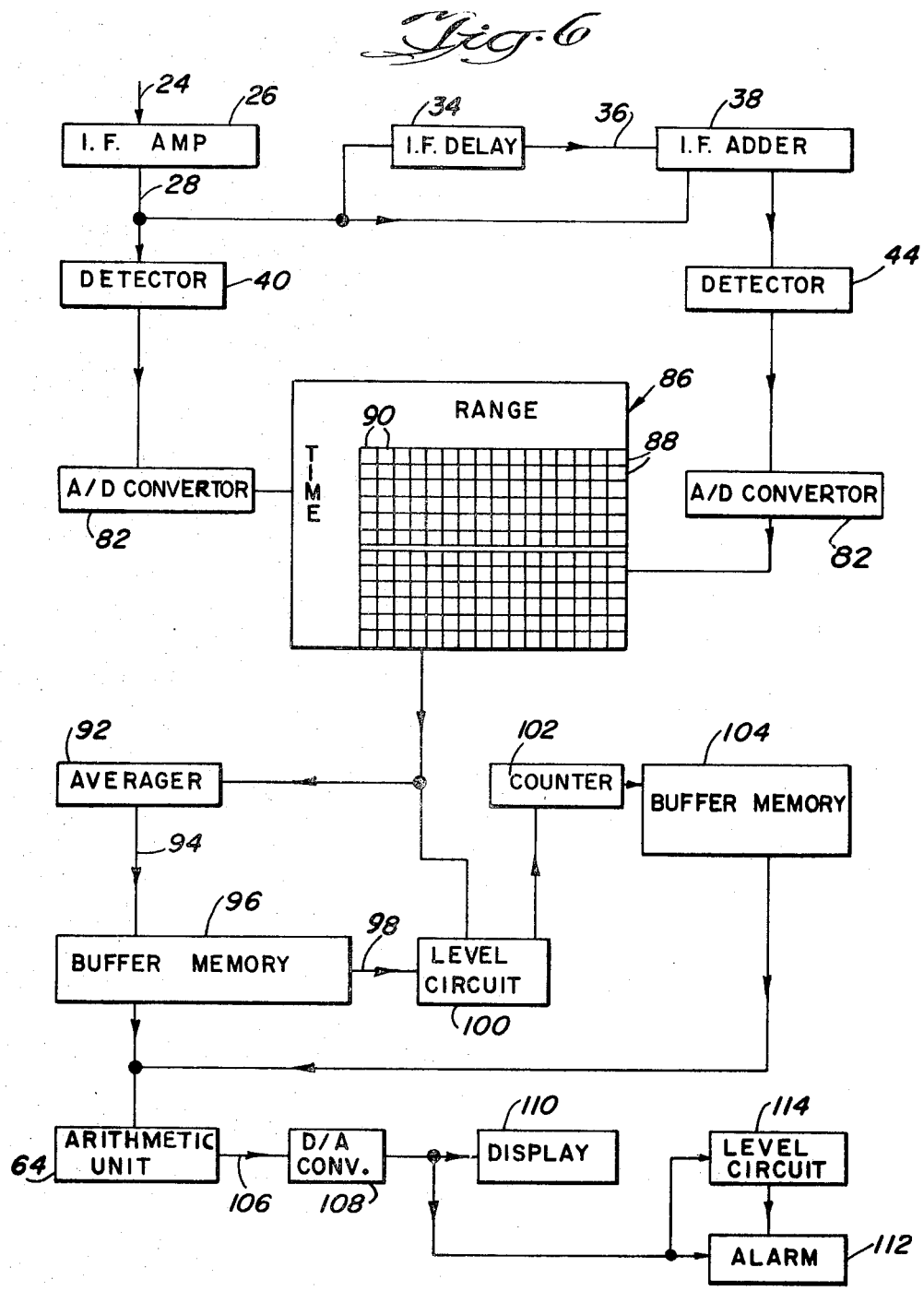

METHOD AND APPARATUS FOR RADAR TURBULENCE DETECTION

BACKGROUND

The detection and measurement of atmospheric turbulence is not only of considerable academic interest but is a problem of considerable practical importance in meteorology and in aviation.

Thus, the detection and measurement of atmospheric turbulence is of great concern in the aviation industry in order to allow aircraft to become aware of, and avoid where possible, turbulence which appears to be hazardous or capable of discomforting passengers riding the aircraft. Such turbulence may take the form of storms containing reflecting scatterers such as rain, snow or hail or may be associated with the phenomenon of clear air turbulence. Such clear air turbulence may be detected either by virtue of associated refractive index perturbations or by means of radar reflecting chaff dispersed into such regions, for example, by aircraft, balloons or other suitable means.

It is of course possible to use a Doppler radar to measure relative motion between the radar source and the target, such as particles in a storm. Fluctuations in this relative velocity as a function of distance through a storm are due to disturbances in horizontal wind. Thus, it would be relatively simple to measure turbulence with a Doppler radar.

Unfortunately, existing airborne weather radar systems are not Doppler radars and do not have Doppler capabilities, and most ground-based weather radars are similarly deficient. Conventional (non-Doppler) radars are, however, in general use in all transport aircraft and as ground radars for detection and mapping of storms.

Present techniques for assessing the potential hazard of a detected storm involve the measurement of signal intensity or storm reflectivity. This approach is based on the assumption that the reflectivity is proportional to the number and size of the scatterers, e.g., rain, snow or hail; and an increase in reflectivity is attributable to an increase in these quantities, i.e., a greater precipitation rate, and, therefore, greater associated updrafts and downdrafts. In other words, this approach is based on the assumption that the more reflective the storm, the more severe are its associated flight hazards.

Refinements in this approach utilize a gradient of reflectivity or the sharpness with which the reflectivity varies from point to point in a storm. Again this technique is based on the theory that this gradient is related to turbulence intensity.

Unfortunately, neither of these assumptions—that the magnitude of reflectivity or the gradient of reflectivity are related to turbulence intensity—is generally valid. They are merely qualitative associations which appear to fail under a variety of conditions.

The purpose of detecting turbulence intensity is to determine or measure the velocity perturbations which will be experienced by an aircraft which traverses the turbulent region. This means that what is required is a measurement of vertical air movement or vertical air perturbations as a function of distance along a flight path.

Where this measurement is not feasible, an alternative is to measure perturbations in horizontal air motion along the flight path on the assumption that the air turbulence is isotropic, i.e., independent of direction. Even if the turbulence is not isotropic, it appears that the intensity of the perturbations in horizontal air motion is generally closely correlated with perturbations in vertical air motion.

Thus, if it is possible to measure the horizontal air motion and the perturbations therein, it would be possible to have a good indication of the vertical air motion and perturbations therein, and, therefore, an indication of the atmospheric turbulence which has the greatest adverse effect and causes the most concern in aviation.

As indicated above, the measurement of such turbulence with a Doppler radar would be a relatively simple procedure since Doppler radar has the capability of detecting differences in the movement of scatterers or reflectors towards and away from the radar beam source. A comparison of such movement in adjacent areas of space along the axis of the radar beam would give an indication of the perturbations in horizontal air movement and thusly an indication of the perturbations in vertical air movement, the desired information.

Unfortunately, conventional radar, i.e., non-Doppler radar, which is the type radar in commercial aircraft, can measure only the intensity of the reflected signal and cannot directly measure the movement of the scatterers forming a part of the atmosphere.

SUMMARY OF INVENTION

In accordance with the present invention, there is provided a method and apparatus for utilizing conventional, non-Doppler radar for the measurement and detection of atmospheric turbulence. The measurement and detection of atmospheric turbulence is effected by the detection of echo signals from two pulse volumes radially spaced apart along the radar beam and by the measurement of the average power and fluctuation spectral characteristics of the echo signals from each of these two separate pulse volumes and by a corresponding measurement of the spectral characteristics of a signal representing the predetection sum of the echo signals from the two volumes.

Since the variance of this "sum" channel is a function of the power-weighted sum of the variance of the fluctuation spectra in the independent channels, plus a term dependent upon the difference in mean radial velocity of the scatterers in the associated pulse volumes, the differences in the mean radial velocity of the reflectors in each volume can be measured. When the spacing between the sample volumes is adjusted to represent distance along an aircraft flight path, for example, this measurement is a measure of the turbulence to be expected in traversing the space between these pulse volumes.

More specifically, the reflected signals from a radar beam may be processed to extract information from the reflected signals representative of specific locations along the radar beam about which information is desired. This is effected by gating the receiver to be responsive to only those portions of the received signals which are being reflected from the volumes in space located at the desired radial position along the beam.

In order to obtain meaningful information regarding atmospheric turbulence, signals reflected from two radially spaced apart volumes are processed in conjunction with each other. A conventional radar is responsive primarily to the time varying intensities of the signals reflected from the scatterers within each and every pulse volume. This information is utilized to obtain the difference in the mean velocities in the two volumes, a measure of the turbulence intensity at scales corresponding to the spacing between the two volumes, and smaller.

Thus, detected video signals at the output of conventional radar systems may be range gated at two ranges with a selectable radial spacing between the two ranges. The range gated outputs represent the instantaneous echo intensities received from the two radially spaced pulse volumes.

The time variations in the intensity of the signals received from each of the pair of pulse volumes are analyzed to provide a measure of the average echo power and the root-mean-square signal fluctuation rate or variance. Simultaneously, signals received from each of the pair of pulse volumes are combined prior to detection and the time variation of the signal intensity of this signal is also analyzed to provide a measure of its average echo power and root-mean-square fluctuation rate or variance.

The signals from the two pulse volumes can be combined, for example, by summing them prior to detection in the I.F. or R.F. stages of the radar receiver. This can be accomplished by means of a delay line having a delay corresponding to the spacing between the pair of pulse volumes.

When the mean radial velocity of the scatterers in the two individual pulse volumes differ, the spectral characteristics of the fluctuation spectrum corresponding to the detected output of the combined signals differ from the spectral characteristics of the fluctuation spectra corresponding to the signals reflected from the individual pulse volumes. This difference is utilized as a measure of the difference in the mean radial velocity of the scatterers in the respective pulse volumes, and thus as a measure of the intensity of the turbulence to be expected in traversing the distance between the two volumes.

A series of echo signals received from a first volume are processed to generate the average power of the echo signals from the first pulse volume and the variance of the fluctuation spectrum of such signals. Similarly the average power and variance of the fluctuation spectrum of echo signals from a second volume can similarly be measured. In addition, the signals reflected from both pulse volumes are summed before detection and the variance of the fluctuation spectrum of the combined echo signals is obtained. With this information, the difference in the mean velocities of the scatterers in the two volumes can be obtained in accordance with the following equation:

$$(\bar{v}_1 - \bar{v}_2)^2 = [(\lambda^2/8)(P_1 + P_2)/P_1 P_2][\Sigma_{1,2}{}^2 \quad (P_1+P_2) - (\Sigma_1{}^2 P_1 + \Sigma_2{}^2 P_2 AY] \quad (1)$$

where $\bar{v}_1$ = mean radial velocity of the scatterers in a first pulse volume $\bar{v}_2$ = mean radial velocity of the scatterers in a second pulse volume $\lambda$ = wavelength $P_1 = \overline{I_1(t)}$ = average power or intensity of the echo signals from the first pulse volume $P_2 = \overline{I_2(t)}$ = average power or intensity of the echo signals from the second pulse volume $\Sigma_1{}^2$ = variance of the fluctuation spectrum of the echo signals from the first volume $\Sigma_2{}^2$ = variance of the fluctuation spectrum of the echo signals from the second volume $\Sigma_{1,2}{}^2$ = variance of the fluctuation spectrum of the predetection sum of the echo signals from the first and second pulse volumes Thus equation (1) shows that the difference in the mean velocities of two radially spaced apart pulse volumes is related to the difference between the power-weighted variance of the fluctuation spectrum of the predetection sum of the echo signals and the sum of the power-weighted variances of the fluctuation spectra of the echo signals from each of the pulse volumes.

In use as airborne radar in which the aircraft might very well be approaching the storm, it is of course desirable to repetitively sample signals from the same volumes of air within the storm throughout the duration of the measurement. This is effected by detecting the leading edge of the storm and gating the reflected signals into the measuring circuitry with respect to the leading edge of the storm regardless of aircraft position relative to the storm.

Thus, by the present invention, the characteristics of the fluctuation spectra of the radar signals reflected from a pair of selected volumes relatively fixed in space can be processed by use of a conventional radar to provide information regarding atmospheric turbulence and to measure the turbulence that can be expected in traversing the space between the two volumes.

It should be understood that since in accordance with the present invention the method and apparatus for detecting atmospheric turbulence effectively provides a measure of the difference in the mean radial velocity of the scatterers between two preselected ranges, the system and method may also provide a measure of the radial wind shear. Thus, for example, when a radar beam is directed essentially horizontally, a strong radial wind shear may be indicative of the existence of a sharp frontal surface or tornado or other disturbance.

The significance of this capability takes on meaning when considering the hazards of aircraft takeoff or landings. Along the takeoff or landing profile of an aircraft, strong wind shear may be hazardous to safe takeoffs or landings and, therefore, the system and method of the present invention is capable of providing a measurement and warning of potentially hazardous wind shear. Similarly, the disclosed system and method may also be used to indicate the presence of potential presence of tornados since these conditions are commonly associated with sharp radial variations in mean wind velocity.

Numerous other advantages and features of the present invention will become readily apparent from the following detailed description of the invention and of one embodiment thereof, from the claims and from the accompanying drawings in which each and every detail shown is fully and completely disclosed as a part of this specification, in which like numerals refer to like parts.

BRIEF DESCRIPTION OF THE DRAWINGS

FIG. 1 is a diagrammatic view showing the use of a radar from both a moving and a fixed station;

FIG. 2a is a diagrammatic view of a radar beam traversing pulse volumes in a storm;

FIG. 2b is a diagrammatic view of a signal showing the variation of radial velocity as a function of range;

FIG. 3 is a block diagram of one embodiment of a radar turbulence measurement system;

FIG. 4 is a block diagram of an alternative embodiment of a radar turbulence measurement system;

FIG. 4a is an alternative of FIG. 4;

FIG. 5 is a block diagram of a subsystem suitable for use in the system of FIG. 3; and FIG. 6 is another alternative embodiment of a radar turbulence measurement system.

DETAILED DESCRIPTION

Referring to FIGS. 1, 2a and 2b, conventional radar detection of atmospheric turbulence is initiated by directing a radar beam 10 from a source such as an aircraft 12 or a ground station 14 toward a region of scatterers 16 such as a storm cloud 18, precipitation particles or artificial tracers such as radar chaff which may have been dispersed into the air to provide detectable echoes.

It can be appreciated that each of the scatterers 16 moves at varying radial velocities. FIG. 2b is a schematic trace 17 of the beam-averaged radial velocities of the scatterers as a function of distance along the radar beam 10 disclosed in FIG. 2a.

At any instant in time, the echo returned to the radar receiver corresponds to a volume of space 20 encompassed with the radar beam and having a radial depth along the beam equal to $h/2$ where $h$ is the length of the transmitted pulse. If $t$ is the time duration of the transmitted pulse, $h=ct$ where $c$ is the speed of light.

The effective pulse depth in space from which echoes are received simultaneously is $h/2$ because when the trailing edge of the pulse is being reflected from particles at range $r$, the leading edge of the pulse will have had time to reach and return from scatterers at a range $r+h/2$ from the radar. Accordingly, the signal received at any instant is the sum of the echoes from all scatterers within a range depth $h/2$ in the detectable region.

As indicated diagrammatically in FIG. 2a there are a great many scatterers 16 within each pulse volume. In Doppler radar the net detected echo signal amplitude from a single pulse volume is the sum of each of the echo signal amplitudes reflected at the various Doppler frequencies.

When this signal is detected coherently and passed through a spectrum analyzer, we obtain the so-called Doppler spectrum corresponding to the signal or the average power returned as a function of Doppler frequency shift. If $P$ is the total average power returned by all the scatterers and $S(f)df$ is the fraction of that power which is returned at Doppler frequencies between $f$ and $f+df$, then $PS(f)df$ is the Doppler spectrum.

Because $f=2v/\lambda$ where $\lambda$ is wavelength and $v$ is radial velocity of the scatterers, the Doppler spectrum is an image of the radial velocity spectrum or the distribution of echo power with radial velocity. Clearly, from the Doppler spectrum as measured with a Doppler radar, the mean Doppler shift and corresponding mean radial velocity as well as the breadth or variance of the spectrum around that mean velocity can be determined.

If this is done at two radially spaced ranges, corresponding to two pulse volumes, then the mean Doppler frequency shifts $\overline{f_1}$ and $\overline{f_2}$, and the associated mean radial velocities $\overline{v}_1$ and $\overline{v}_2$ can also be obtained. The difference $(\overline{v}_1-\overline{v}_2)$, or its square, is a measure of the turbulence to be experienced in traversing the distance between the two pulse volumes.

Unfortunately, this cannot be done with a conventional, non-Doppler radar. In such a radar system, the signals are detected without a coherent reference; typically by a square law envelope detector whose output is proportional to $I(t)$ the instantaneous square of the signal amplitude $A(t)$. Neglecting the oscillating term corresponding to the carrier frequency, $A(t)$ may be represented by:

$$A(t)=\Sigma a_i e^{-i\omega_i t} \qquad (2)$$

where $a_i$ may be considered to represent the signal amplitude returned by all scatterers moving with radial velocity $v_i$ and producing Doppler shift $f_i$ and angular Doppler frequency and:

$$\omega_i=2\pi f_i=4\pi v_i/\lambda \qquad (3)$$

Thus, the instantaneous output of the envelope detector of the conventional radar may be expressed by:

$$I(t)=\Sigma_i a_i^2+2\Sigma_{ij}a_ia_j \cos(\omega_i-\omega_j)t[i \ne j] \qquad (4)$$

It can be seen from Equation (4) that the signal intensity is comprised of a DC term $\overline{I(t)}=\Sigma a_i^2$ corresponding to the average intensity, and fluctuating components at angular rates:

$$\Omega_{ij}=2\pi F_{ij}=\omega_i-\omega_j=2\pi(f_i-f_j) \qquad (5)$$

$$F_{ij}=(f_i-f_j)=2/\lambda(v_i-v_j) \qquad (6)$$

In other words, the beating of the signals from all the scatterers having radial velocity $v_i$ and Doppler shift $f_i$ with those having velocity $v_j$ and Doppler shift $f_j$ produces fluctuations of the signal intensity with frequency $F_{ij}=(f_i-f_j)$. If the signal having an intensity $I(t)$ represented by Equation (4) is passed through a spectrum analyzer, the result is the so-called "fluctuation spectrum." It may be shown readily that the fluctuation spectrum:

$$S(F)\,dF=dF\int_{-\infty}^{\infty}S(f)S(f+F)df \qquad (7)$$

This is the integral of the Doppler spectrum convolved with itself after being displaced by fluctuation frequency $F$. Since $F$ takes on both positive and negative values and $S(F)=S(-F)$, $\overline{F}=0$ and:

$$\Sigma^2=\overline{F^2}=\int_{-\infty}^{\infty}F^2 S(F)\,dF=2\sigma_f^2 \qquad (8)$$

In other words, the variance of the signal intensity fluctuation spectrum is exactly twice that of the Doppler spectrum, but all knowledge of the mean Doppler frequency and corresponding mean radial velocity has been lost.

If, however, the frequency with which $I(t)$ crosses a threshold level set of $\overline{I(t)}$ can be determined, then the output is directly proportional to the root-mean-square fluctuation frequency, $(\overline{F^2})^{1/2}$, and thus to the standard deviation of the fluctuation spectrum. One device which performs this function is the so-called "R-meter" described by Rutkowski and Fleisher in "R-meter: an Instrument for Measuring Gustiness" M.I.T. Dept. of Meteorology, Weather Radar Research Report No. 24, (1955).

If the signals returned from the first pulse volume 20 are added to those from the second pulse volume 22 in the intermediate frequency (IF) or radiofrequency stages prior to detection, the sum signal after coherent phase detection (in a Doppler radar) would be:

$$A(t)=\Sigma a_{1i}\cos 2\pi(f_i-\overline{f_1})t+\Sigma a_{2i}\cos 2\pi(f_i-\overline{f_2})t \qquad (9)$$

where the individual Doppler shifts in each volume relative to the mean Doppler frequencies, $\overline{f_1}$ and $\overline{f_2}$ in respective volumes are indicated. The net Doppler spectrum is the sum of the individual Doppler spectra, each weighted according to its total power:

$$(P_1+P_2)S_{1,2}(f)\,df=P_1S_1(f)\,df+P_2 S_2(f)\,df \qquad (10)$$

where $P_1 = \overline{I_1(t)}$ = the total power in the first spectrum, i.e., the average power of the signals reflected from a first pulse volume $P_2\,32\,\overline{I_2(t)}$ = the total power in the second spectrum, i.e., the average power of the signals reflected from a second pulse volume $S_1(f)$ = normalized spectrum of the signals reflected from a first pulse volume $S_2(f)$ = normalized spectrum of the signals reflected from a second pulse volume $S_{1,2}(f)$ = normalized spectrum of the predetection sum of the signals reflected from the first and second pulse volumes where $\int S_{1,2}(f)df=1$ With a Doppler radar, the individual mean frequencies $\overline{f_1}$ and $\overline{f_2}$ in the respective pulse volumes and the combined spectrum of the two volumes could be measured and thus $\overline{v}_1-\overline{v}_2$ determined. This or its square is the desired measurement of turbulence, or, in the case of organized motions, a measure of the radial shear between the two volumes.

However, with the incoherent radar, only the fluctuation spectrum of signal intensities can be measured; either the entire fluctuation spectrum, or, for example, only its variance, see Equation (8), where it is shown that the variance of the fluctuation spectrum is exactly twice that of the Doppler spectrum. Thus, the variance of the combined Doppler spectrum in terms of the variance of the individual spectra from the two volumes should first be determined. It is readily shown that:

$$\overline{f_{12}^2}=(P_1\overline{f_1^2}+P_2\overline{f_2^2})/(P_1+P_2) \qquad (11)$$

and $$\overline{f_{12}}=(P_1\overline{f_1}+P_2\overline{f_2})/(P_1+P_2) \qquad (12)$$

The variance of the spectrum is given by the equation:

$$\sigma_f^2=\overline{f^2}-(\overline{f})^2 \qquad (13)$$

By combining Equations (11) and (12) the variance of the combined Doppler spectra can be obtained:

$$\sigma_{12}^2=(P_1\sigma_1^2+P_2\sigma_2^2)/(P_1+P_2)+[P_1P_2/(P_1+P_2)^2]x[\overline{f_1}-\overline{f_2}]^2 \qquad (14)$$

However, an incoherent radar can measure only the variances of the associated fluctuation spectra. Thus, noting that $\sigma^2=\Sigma^2/2$ and that $f=2v/\lambda$, it can be shown that:

$$(\overline{v}_1-\overline{v}_2)^2=[(\lambda^2/8)\cdot(P_1+P_2)/P_1P_2][\Sigma_{1,2}^2(P_1+P_2)-(\Sigma_1^2P_1+\Sigma_2^2P_2)] \qquad (1)$$

It thus can be seen that measurement of the average power and variance of the fluctuation spectra for each of the two volumes separately and the variance of the spectrum of the combined volumes will generate sufficient information to provide an output indicative of the turbulence intensity or radial shear at scales corresponding to the space in between the two volumes and at smaller scales.

This spacing may be chosen so as to correspond to the turbulent scales by which aircraft are most severely affected. Alternatively, the spacing $L$ may be varied progressively so that $\overline{v}_1=\overline{v}(r)$ and $\overline{v}_2=\overline{v}(r+L)$, where $r$ is the distance to volume 1 and $(r+L)$ is the distance to volume 2.

The quantity $D(L)=[v(r)-v(r+L)]^2$ is the so-called structure function of turbulence and is related quantitatively to the turbulence spectrum. In particular $D(L)$ is a close approximation to the kinetic energy in the turbulence spectrum at scales equal to and smaller than scale L. Accordingly, the difference of measurements at two scales $L_2$ and $L_1$, or $D(L_2)-D(L_1)$, where $L_2>L_1$, provides a close approximation to the turbulent kinetic energy at scales between $L_1$ and $L_2$.

Referring now to FIG. 3 there is shown a block diagram for one system suitable for generating an output indicative of such atmospheric turbulence. In this system the echo signals on line 24 are amplified by I.F. amplifier 26. The instantaneous output of I.F. amplifier 26 represents the sum of all of the echo signals received at that instant from a radar pulse volume.

The output 28 of I.F. amplifier 26 is connected to two channels, a single volume channel 30, and a sum channel 32. Output 28 is connected to both the single channel 30 and to the sum channel 32. Output 28 is also connected to the sum channel 32 through an I.F. delay 34 which delays the signal by an amount $t=L/2c$ where L is the desired spacing of the two volumes between which the turbulence measurement is to be made and c is the speed of light.

The output 28 from the I.F. amplifier 26 is connected to the input of a detector 40 in the single volume channel 30. The undelayed output 28 and the output 36 from the I.F. delay 34 are added in an I.F. adder 38 the output 42 of which is connected to the input of a detector 44 in sum channel 32. Thus, the output 36 from I.F. delay 34 at time two represents the signals actually received at time one, i.e., from the first pulse volume 20, while the output 28 of the I.F. amplifier 26 at time two represents the signals received at time two from the second pulse volume 22.

It is to be understood, that the echo signals can be separated into a single volume channel and a sum channel at any stage in the system prior to detection. As can be seen in FIG. 4, for example, echo signals on line 45 are delayed in an R.F. delay 46 the output of which is connected to an R.F. adder 47. The signals on line 45 are also connected directly to the R.F. adder 47. The output 48 of R.F. adder 47 represents the predetection sum of the signals received from the first pulse volume 20 and the second pulse volume 22. The output 48 of the R.F. adder and the signals on line 45 are each amplified in separate R.F. amplifiers 49, are passed through separate mixers 50, amplified in I.F. amplifiers 26', the outputs of which are connected, respectively, to detectors 44 and 40.

The mixers 50 mix the respective input R.F. signals with a signal from a conventional local oscillator (not shown) in order to heterodyne the radiofrequencies down to intermediate frequencies (I.F.) capable of being passed by the I.F. amplifiers, all as is well known.

Alternatively, as shown in FIG. 4a, the signals on line 45 can be initially amplified in a single R.F. amplifier 49' before being split into the single volume and sum channels. The output of R.F. amplifier 49' is delayed in R.F. delay 46', the output of which is connected to an R.F. adder 47'. The output of the R.F. amplifier 49' is also connected to the R.F. adder 47', the output of which is again representative of the predetection sum of the signals from the first and second pulse volumes. As in FIG. 4, the output of the R.F. adder 47' and of the R.F. amplifier 49' are separately processed through mixers 50 and I.F. amplifiers 26' before being inputted to the detectors 44 and 40, respectively.

One output 52 of the single volume detector 40 is connected to power and fluctuation spectrum variance circuits 53, 54 for the first and second volumes, respectively. A second output 55 from the detector 40 is connected to a storm-leading edge trigger 56 which generates trigger pulses representative of the leading edges of each reflecting region or storm.

The output 57 of trigger 56 can be selected, for example, by manual operation, to correspond to a storm to be measured, and thus generates trigger pulses only for the selected storm. These trigger pulses permit the subsequent circuitry to operate in response only to the selected storm.

The output 57 from storm leading edge trigger 56 controls a variable pulse delay circuit 58 which gates the output 52 of detector 40 into the respective power and variance circuits 53, 54 so that each of these circuits receives signals only from the respective pulse volumes 20, 22. Variable pulse delay circuit 58 may gate the detector circuit 40 so that it responds only to signals from the desired pulse volumes and may in addition or alternatively gate each of the power and variance circuits to respond to only that portion of the output from detector 40 corresponding to the representative pulse volumes.

Thus, variable pulse delay circuit 58 performs two functions. It controls the delay between the storm leading edge trigger pulse and the first gating pulse, thereby allowing for selection of the desired position of the first pulse volume relative to the edge of the storm. The variable pulse delay circuit also controls and varies the delay between the first gating pulse and the second gating pulse to vary the distance L between the pulse volumes. In this manner, the region within a storm to be examined can be selected and the distance between two pulse volumes can be set to any desired scale of turbulence e.g., to the scale to which an aircraft is most sensitive.

The output 60 of the sum channel detector 44 is connected to a sum power and variance circuit 62 which also is gated by delay circuit 58 to limit the input from the sum channel detector to a period of time during which the output is representative of the sum of the signals from the first and second pulse volumes 20, 22.

In the case of a ground based radar, storm leading edge trigger 56 is not generally required since the measurements of power and variance can be made at a selected range fixed with respect to the radar. Only when the radar is on a moving platform is it required to provide a reference trigger at the leading edge of the storm so that the succession of echo pulses required for power and variance measurements will have been returned from the same pulse volume throughout the measurement period.

In the case of airborne radars, the variable pulse delay circuit 58 and the I.F. delay 34 can be automatically linked to the aircraft's airspeed indicator, thus setting the turbulence scale L in accordance with that to which the aircraft is most sensitive at the speed in question.

Each of the power and variance circuits 53, 54 and 62 generate an output representative of the average power and the fluctuation spectrum variance, respectively, corresponding to the first pulse volume 20, the second pulse volume 22, and the predetection sum of the signals received from both pulse volumes 20, 22. These outputs are connected to an arithmetic unit 64 which performs the computations required by Equation (1) to generate an output representative of the difference between the mean radial velocity in the two volumes and therefore the turbulence intensity at scales equal to and smaller than the spacing between the two volumes.

It should be realized, of course, that successive or simultaneous measurements may be accomplished not only between the first and second pulse volumes 20, 22, but between other pulse volumes, thus displaying turbulence intensity at all ranges in the atmospheric region under observation. It should be also apparent that such a system may make measurements between two pulse volumes which are spaced apart by increasing steps of L. This then would provide an indication of the turbulence structure function and spectrum as a function of the spacing between pulse volumes.

FIG. 5 shows one embodiment of a power and variance circuit for use in the system of FIG. 3. Thus, the output from a detector 40 is range gated by variable delay 58 and is sampled and held by a boxcar circuit 66 the output 68 of which is integrated by an integrator 70 having a time constant adjusted to the desired sample length. The output 72 of the integrator 70 is the average power at the selected range. The average power is one of the parameters required in the computation of turbulence intensity.

The average power output 72 is also used to set a threshold level in threshold level circuit 74 to a value equal to or proportional to the average power. A frequency meter 76 measures the rate at which this level is crossed in one direction by the individual echo signal intensities. The output 78 of the frequency meter is the root-mean-square fluctuation frequency $\overline{\Sigma}$, the standard deviation of the fluctuation spectrum. This output is squared in the squaring circuit 80 to provide an output directly proportional to the variance, the other parameter required in the computation of turbulence intensity.

Although a plurality of power and variance circuits are shown in FIG. 3, it should be clear that a single circuit can be used sequentially if appropriate storage capabilities are inserted into the system. It is evident also that the gating and power and variance measurement circuitry of FIG. 3 may be duplicated any number of times to provide simultaneous turbulence measurements at a multiplicity of ranges through the storm.

In some circumstances, it is of course desirable to measure and display turbulence simultaneously at all ranges throughout a storm. Since a typical storm may contain some 100 to 200 or more pulse volume pairs, it would become expensive and would require excessive equipment volume to reproduce the gating and power and variance measurement circuitry of FIG. 3. To overcome this restriction, the single channel video and sum channel signal may be stored in the manner illustrated by the embodiment of FIG. 6, which has the capability of obtaining measurements at a plurality of ranges throughout the storm.

In such a multiple range system, the output 28 of the I.F. amplifier 26 is again connected to two channels. After detection in detector 40, the successive pulses are converted to a digital form in A/D converter 82 and stored in a digital memory 86. Each row 88 of the memory 86 stores pulses from different volumes in range for a single echo signal and each column 90 stores successive echo signals from the same pulse volume. In a similar manner, the output of detector 44 of the sum channel is similarly converted in an A/D converter 82 and stored in memory 86 in a similar arrangement.

After the receipt of all of the echo signals, the average power of the signals stored in each range column 90 can be obtained by reading out the stored information in each column 90 into averager 92 and averaging these outputs. The output 94 from averager 92 for each column 90 is stored in buffer memory 96. The stored value of average echo power 98 is then used to set a threshold level circuit 100, the threshold level being changed sequentially as the read out of memory 86 is stepped from range to range.

The signals for each range are again read out in time sequence and the counter 102 may then count the total number of times that the change in intensity from one time to the other crosses the average power level set in threshold circuit 100 in a unipolar direction. This number is proportional to the r.m.s. frequency of the fluctuation spectrum, and thus to its standard deviation. This calculation can be repeated for each range and stored in the buffer memory 104.

The output of the two buffers 96, 104 are connected to an arithmetic unit 64 which performs all the operations required to generate an output 106 representative of $(\overline{v}_1 - \overline{v}_2)^2$ for each and every pair of pulse volumes, the signals from which are being analyzed. The output 106 may be reconverted to an analog form by a D/A converter 108 and displayed to provide a graphic presentation of turbulence as a function of distance along the radar beam in display 110.

The output may also be used to trigger an alarm 112 if the output exceeds a preselected threshold level 114 indicating that the storm should not be penetrated.

It should be realized that the various functions performed by the systems disclosed in FIGS. 3, 4, 4a, 5 and 6 may also be accomplished by various other techniques. For example, average echo power can be measured by use of either analog or digital integrators or by measurement of the integral of the entire fluctuation spectrum of signals received from a given pulse volume. The variance of the fluctuation spectrum can alternatively be obtained by employing a spectrum analyzer to measure the entire fluctuation spectrum and computing its variance automatically.

Where storage of the received data is desired, it is clear that it may be stored either in analog or digital form and that in either case the desired measurements and computations can be performed by use of either digital or analog circuitry or a combination thereof. It should also be understood that the functions disclosed as occurring in the I.F. stages of the system could also be accomplished in the R.F. stages with the modification of the associated circuitry.

Thus, there has been disclosed a radar system and method for measurement of atmospheric turbulence without the utilization of Doppler techniques. This capability permits the acquisition of desired atmospheric information by use of generally less complex circuitry and at low cost. Of great significance is the fact that such capabilities can be incorporated as a part of existing radar systems thereby overcoming one of the major objections to other proposals, the need to replace expensive equipment already in use.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. A method for detecting atmospheric turbulence comprising the steps of radiating a radar beam towards a region of scatterers, receiving echo signals reflected from said scatterers including first echo signals reflected from scatterers located in a first pulse volume along said beam and second echo signals reflected from scatterers located in a second pulse volume along said beam spaced radially from said first pulse volume, combining said first and second echo signals prior to detection to generate combined echo signals, sensing the average power of said first echo signals, said second echo signals and said combined echo signals and generating power level signals representative thereof, sensing the spectral characteristics of the fluctuation spectra of said first echo signals, said second echo signals and said combined echo signals and generating spectra signals representative thereof, and operating on said power level and spectra signals to provide as a function of the average power and the spectra characteristics of said first echo signals, said second echo signals and said combined echo signals intelligence representative of the difference between the mean radial velocity of the scatterers in said first pulse volume and the mean radial velocity of the scatterers in said second pulse volume as an indication of the atmospheric turbulence between said pulse volumes.

2. A method as claimed in claim 1 wherein said first and second echo signals are received sequentially, and in which the step of combining said first and second echo signals includes the step of delaying said first echo signals until said second echo signals are received and adding said first and second signals together prior to detection to generate said combined echo signals.

3. The method as claimed in claim 2 including the step of varying the delay of said first echo signals to alter the spacing between said pulse volumes.

4. A method as claimed in claim 3 including the steps of receiving and combining said echo signals sequentially, storing said signals as a function of range and time until a selected number of said signals have been received, sensing the average power and spectral characteristics of the fluctuation spectra of the received and combined echo signals of selected pairs of pulse volumes, whereby intelligence indicative of the turbulence at selected radial positions along said radar beam can be provided.

5. A method as claimed in claim 2 including the steps of radiating said radar beam from a moving aircraft and varying said delay as a function of the speed of said aircraft.

6. A method as claimed in claim 5 including the steps of generating a trigger signal representative of the leading edge of said scatterers and gating said echo signals relative to said trigger signal, whereby said first pulse volume is spaced radially a selected distance from the leading edge of said scatterers.

7. A method as claimed in claim 2 including the steps of adjustably gating said echo signals to maintain said pulse volumes fixed in space during the measurement period independent of aircraft velocity.

8. A method as claimed in claim 1 including the steps of receiving said echo signals from a plurality of different pulse volumes spaced radially from each other, combining different pairs of said received echo signals prior to detection to generate a plurality of different combined echo signals, repeating the remaining steps to provide said intelligence representative of the difference between the mean radial velocity of scatterers in one pulse volume of each pair of pulse volumes and the mean radial velocity of the scatterers of the other pulse volume in each pair of pulse volumes to provide an indication of the atmospheric turbulence as a function of range.

9. A method as claimed in claim 8 including the step of displaying said intelligence as a function of range.

10. A method as claimed in claim 8 including the steps of combining said received echo signals from a first and a second volume prior to detection to generate a first combined echo signal, combining said received echo signals from said first and a third pulse volume prior to detection to generate a second combined echo signal, repeating the remaining steps to provide said intelligence representative of the difference between the mean radial velocity of scatterers in said first pulse volume and the mean radial velocity of the scatterers in said second pulse volume and to provide said intelligence representative of the difference between the mean radial velocity of scatterers in said first pulse volume and the mean radial velocity of the scatterers in said third pulse volume to provide an indication of the atmospheric turbulence as a function of range between each pair of pulse volumes, whereby a comparison of said indications of atmospheric turbulence may be made to provide an approximation of the turbulent kinetic energy therebetween.

11. A method as claimed in claim 1 including the step of varying the spacing between said first and second pulse volumes.

12. A method as claimed in claim 1 in which the step of sensing the spectral characteristics of said first echo signals, said second echo signals and said combined echo signals includes the steps of measuring the frequency variance of the fluctuation spectra of each of said first echo signals, said second echo signals and said combined echo signals.

13. A method as claimed in claim 12 including the step of providing said intelligence as a function of the difference between the power-weighted variance of the fluctuation spectrum of said combined echo signals and the sum of the power-weighted variances of the fluctuation spectra of said first echo signals and said second echo signals.

14. A method as claimed in claim 1 in which the step of sensing the average power of said first echo signals, said second echo signals and said combined echo signals includes the steps of detecting the intensity of each of said first echo signals, measuring the average power of said first echo signals and generating in response thereto first power level signals representative of the average power of said first echo signals, detecting the intensity of each of said second echo signals, measuring the average power of said second echo signals and generating in response thereto second power level signals representative of the average power of said second echo signals and detecting the intensity of each of said combined echo signals, measuring the average power of said combined echo signals and generating in response thereto combined power level signals representative of the average power of said combined echo signals, in which the step of sensing the spectral characteristics of said first echo signals, said second echo signals and said combined echo signals includes the steps of measuring the frequency variance of the fluctuation spectrum of said first echo signals and generating a first variance signal representative thereof, measuring the frequency variance of the fluctuation spectrum of said second echo signals and generating a second variance signal representative thereof and measuring the frequency variance of the fluctuation spectrum of said combined echo signals and generating a combined variance signal representative thereof and including the steps of operating on said first, second and combined average power signals and said first, second and combined variance signals to provide said intelligence in accordance with the following formula:

$$(\overline{V}_1 - \overline{V}_2)^2 = [(\lambda^2/8) \quad (P_1+P_2)/P_1 P_2][\Sigma_{1,2}{}^2(P_1+P_2)-(\Sigma_1{}^2 P_1+\Sigma_2{}^2 P_2)] \text{ where}$$

$\overline{v}_1$ = average mean radial velocity of the scatterers in a first pulse volume
$\overline{v}_2$ = mean radial velocity of the scatterers in a second pulse volume
$\lambda$ = wavelength
$P_1 = \overline{I_1(t)}$ = average power or intensity of the echo signals from the first pulse volume
$P_2 = \overline{I_2(t)}$ = average power or intensity of the echo signals from the second pulse volume
$\Sigma_1{}^2$ = variance of the fluctuation spectrum of the echo signals from the first volume
$\Sigma_2{}^2$ = variance of the fluctuation spectrum of the echo signals from the second volume
$\Sigma_{1,2}{}^2$ = variance of the fluctuation spectrum of the combined echo signals from the first and second pulse volumes 15. A method as claimed in claim 14 in which the step of measuring the variance of each of said first echo signals, said second echo signals and said combined echo signals includes the step of measuring the rate at which the individual echo signal intensities of each of the respective echo signals cross a threshold level proportional to the average power of the corresponding echo signals.

16. A method as claimed in claim 1 including the steps of radiating said radar beam from a moving aircraft and varying the spacing between said first and second pulse volumes as a function of the speed of said aircraft, and selecting that delay corresponding to the scale of turbulence to which the aircraft is most sensitive at the corresponding air speed.

17. A method for detecting atmospheric turbulence by determining the difference between the mean radial velocity of scatterers in one of a pair of pulse volumes and the mean radial velocity of scatterers in another of said pair of pulse volumes comprising the steps of radiating a radar beam towards a region of scatterers, receiving echo signals reflected from said scatterers, operating on said echo signals to define the echo signals reflected from each of a plurality of pulse volumes spaced radially apart along said beam, sensing the average power of each of the echo signals reflected from a pair of said pulse volumes and generating power level signals representative thereof, sensing the spectral characteristics of each of said echo signals reflected from said pair of pulse volumes and generating spectra signals representative thereof, combining said echo signals reflected from said pair of pulse volumes prior to detection to generate combined echo signals, sensing the average power of said combined echo signals and generating combined power level signals representative thereof, sensing the spectral characteristics of said combined echo signals and generating combined spectra signals representative thereof, and operating on said power level and spectra signals to provide as a function of the average power and spectral characteristics of each of said echo signals intelligence representative of said difference in the mean velocity of scatterers in the pair pulse volumes as an indication of the atmospheric turbulence between said pulse volumes.

18. A method as claimed in claim 17 including, the steps of receiving and combining said echo signals received from different pairs of pulse volumes sequentially, storing said signals as a function of range and time until a selected number of said signals have been received, sensing the average power and spectral characteristics of the fluctuation spectra of the received and combined echo signals from selected pairs of pulse volumes, to provide intelligence representative of said difference in the mean velocity of scatterers in each of said different pairs of pulse volumes as an indication of atmospheric turbulence between each of said plurality of different pairs of pulse volumes, and providing an indication of atmospheric turbulence as a function of radial position along said radar beam.

19. A radar system for detection of atmospheric disturbance comprising a radar transmitter, a radar antenna coupled to said transmitter for radiating a radar beam towards a region of scatterers and for receiving echo signals reflected from said scatterers, said echo signals including first echo signals reflected from scatterers located in a first pulse volume along said beam and second echo signals reflected from scatterers located in a second pulse volume along said beam spaced radially from said first pulse volume, first circuit means receiving said echo signals from said source and combining said first and second echo signals in response thereto, second circuit means receiving said echo signals from said source and said first circuit means and generating power level signals representative of the average power of said first, second and combined echo signals in response thereto, third circuit means responsive to said first, second and combined echo signals for measuring the spectral characteristics thereof and generating spectra signals representative thereof, and output circuit means receiving said power level and spectra signals and generating in response thereto an output representative of the difference between the mean radial velocity of the scatterers in said first pulse volume and the mean radial velocity of the scatterers in said second pulse volume as an indication of the atmospheric turbulence between said pulse volumes.

20. A system as claimed in claim 19 including range gating circuit means for limiting the input to said first, second and third circuit means to said first and second echo signals.

21. A system as claimed in claim 19 wherein said third circuit means includes variance measuring circuit means receiving said first, second and combined echo signals and said power level signals and generating a variance signal representative of the variance of the fluctuation spectra of said first, second and combined echo signals in response thereto; said output circuit means including means receiving said power level and variance signals and computing the difference between the power-weighted variance of the fluctuation spectrum of said combined echo signals and the sum of the power-weighted variance of the fluctuation spectra of said first and second echo signals, and for generating an output representative thereof.

22. A system as claimed in claim 19 wherein said first circuit means includes an I.F. delay receiving said first echo signals and delaying said first echo signals an amount equal to the spacing between said pulse volumes, and an I.F. adder receiving the delayed first echo signals and said second echo signals simultaneously and combining said signals by adding said signals together prior to detection.

23. A system as claimed in claim 19 wherein said first circuit means includes an R.F. delay receiving said first echo signals and delaying said first echo signals an amount equal to the spacing between said pulse volumes, and an R.F. adder receiving the delayed first echo signals and said second echo signals simultaneously and combining said signals by adding said signals together prior to detection.

24. A system as claimed in claim 19 including a threshold circuit, means for setting said threshold circuit to a preselected value of atmospheric turbulence between said first and second pulse volumes indicative of hazardous turbulence intensity, and an alarm circuit connected to said threshold circuit and said output circuit means and generating an alarm in response to an output from said circuit means indicative of atmospheric turbulence between said pulse volumes greater than said preselected level.

25. A radar system for detection of atmospheric turbulence at a plurality of ranges throughout the radial extent of a region of atmospheric scatterers comprising a radar source for radiating a radar beam towards said region of scatterers and for receiving echo signals reflected from said scatterers, said echo signals including separate echo signals reflected from scatterers located in each of a plurality of pulse volumes spaced radially along said beam, first circuit means receiving the echo signals from each of said pulse volumes and generating an output representative thereof, first detector circuit means receiving said first circuit output and generating a single detection signal for each signal received from each pulse volume, delay circuit means receiving said first circuit output and delaying said output a selected time interval, signal adding circuit means receiving the said delayed output and said first circuit output and adding together said outputs generating a combined echo signal for each of the signals received from each of a pair of pulse volumes, second detection circuit means receiving said combined echo signals and generating a combined detection signal for each combined signal from each pair of pulse volumes, signal storage means receiving said single detection signals and said combined detection signals and separately storing each of said detection signals, second circuit means extracting stored single and combined detection signals from said signal storage means for each pair of pulse volumes and generating power level signals representative of the average power of said single and combined echo signals for each pair of pulse volumes in response thereto, third circuit means extracting said stored single and combined detection signals from said signal storage means for each pair of pulse volumes and measuring the spectral characteristics of the fluctuation spectra thereof and generating spectral signals representative thereof, and output circuit means receiving said power level and spectral signals and generating in response thereto outputs representative of the difference between the mean radial velocity of the scatterers in one pulse volume and the mean radial velocity of the scatterers in the other pulse volume for each pair of pulse volumes and providing an output indicative of the atmospheric turbulence as a function of range throughout said region of scatterers.

\* \* \* \* \*

UNITED STATES PATENT OFFICE
CERTIFICATE OF CORRECTION

Patent No. 3,646,555            Dated February 29, 1972

Inventor(s) David Atlas

It is certified that error appears in the above-identified patent and that said Letters Patent are hereby corrected as shown below:

Column 3, equation (1), that portion of the equation reading "$\sum 2^2 P_2 AY]$" should read --$\sum 2^2 P_2)]$--;

line 41, "$\sum_{,2}^2$" should read --$\sum_{1,2}^2$--.

Column 4, line 52, "with" should read --within--.

Column 5, equation (2), that portion which reads "$\sum a_1 e^{-i\omega_1 t}$" should read --$\sum a_1 e^{-i\omega t}$--;

equation (4), that portion of the equation reading "$\sum_1 a_1^2 + 2\sum_{1/j}$" should read --$\sum a_1^2 + 2\sum$--.

Column 6, equation (9), that portion of the equation reading "$(f_1 - f_2)$" should read --$(f_{21} - f_2)$--;

line 21, "$P_2 32 \overline{I_2(t)}$" should read --$P_2 = \overline{I_2(t)}$--;

equation (14), those portions of the equation reading "$(P_1{}^2$" and "$(P_1 az P_2)$" and "$/(P_1 P_2)^2$" should read --$(P_1{}^2$-- and --$(P_1 + P_2)$-- and --$/(P_1 + P_2)^2$--, respectively.

Column 12, line 7, that portion of the formula reading "$(\overline{V}_1 - \overline{V}_2)^2$" should read --$(\overline{v}_1 - \overline{v}_2)^2$--.

Column 13, lines 6 and 7, "transmitter, a radar antenna coupled to said transmitter" should read --source--.

Signed and sealed this 18th day of July 1972.

(SEAL)
Attest:

EDWARD M. FLETCHER, JR.              ROBERT GOTTSCHALK
Attesting Officer                    Commissioner of Patents